(12) United States Patent
Bland, Jr. et al.

(10) Patent No.: US 8,062,402 B2
(45) Date of Patent: Nov. 22, 2011

(54) FILTER HOLDING FRAME WITH CLAMPING MECHANISM

(75) Inventors: Larry E. Bland, Jr., Washington, NC (US); Mark Huza, Columbia, MD (US)

(73) Assignee: Camfil Farr, Inc., Riverdale, NJ (US)

( * ) Notice: Subject to any disclaimer, the term of this patent is extended or adjusted under 35 U.S.C. 154(b) by 1004 days.

(21) Appl. No.: 11/670,907

(22) Filed: Feb. 2, 2007

(65) Prior Publication Data

US 2007/0199289 A1 Aug. 30, 2007

Related U.S. Application Data

(60) Provisional application No. 60/765,459, filed on Feb. 3, 2006.

(51) Int. Cl.
*B01D 46/00* (2006.01)

(52) U.S. Cl. ............................ 55/482; 55/480; 55/493

(58) Field of Classification Search ............ 55/493, 55/495, 490, 492, 501, 510, DIG. 31, 480, 55/482; 49/394, 395; 292/126, 128, 173, 292/178
See application file for complete search history.

(56) References Cited

U.S. PATENT DOCUMENTS

| | | | |
|---|---|---|---|
| 1,850,101 A * | 3/1932 | Greene | 55/485 |
| 4,141,704 A * | 2/1979 | Berglund | 55/379 |
| 5,464,461 A * | 11/1995 | Whitson et al. | 55/480 |
| 6,588,775 B2 * | 7/2003 | Malone, Jr. | 280/47.18 |

OTHER PUBLICATIONS

"Sidelock®" Product sheet 2415-0606, Camfil Farr, Date unknown.
"Magna/Pack" Product bulletin 2411-0606, Camfil Farr, Date unknown.
"Magna-Frame I" Product sheet 2303A-0606, Camfil Farr, Date unknown.
"Magna-Frame II" Product sheet 2303B-0606, Camfil Farr, Date unknown.
"Magna-Frame" III Product sheet 2303C-0606, Camfil Farr, Date unknown.
"Magna-Grid" Product sheet 2302-0606, Camfil Farr, Date unknown.

* cited by examiner

*Primary Examiner* — Duane Smith
*Assistant Examiner* — Karla Hawkins
(74) *Attorney, Agent, or Firm* — Patterson & Sheridan, LLP

(57) ABSTRACT

Embodiments of the invention generally provide a frame assembly having an integral holding frame/clamp. The frame assembly is typically mounted in a housing of an air handler or other air moving conduit. The holding frame/clamp is coupled to the frame assembly by a hinge. The holding frame/lamp is configured to retain a prefilter. When the holding frame/clamp is to a closed position, the holding frame/clamp urges a final filter sealingly against the frame assembly. The clamp holding frame/clamp is maintained in the closed position by a latch. The latch facilitates removal and replacement of the final ter rapidly without tools, thereby substantially reducing the expense associated with filter change out.

14 Claims, 11 Drawing Sheets

FILTER HOLDING FRAME WITH CLAMPING MECHANISM

CROSS-REFERENCE TO RELATED APPLICATIONS

This application claims benefit from U.S. Provisional Patent Application Ser. No. 60/765,459, filed on Feb. 3, 2006, which is incorporated herein by reference in its entirety.

BACKGROUND

Filter holding frames, such as Type 8 holding frames, may be used with a variety of fasteners, which will allow the installation of various combinations of ASHRAE prefiltration and final filtration into a ventilation system. Type 8 holding frames are available from Camfil Farr, Inc., of Riverdale, N.J. The installation may include any, or combinations of the following:
Any 1" deep panel or pleated filter
Any 2" deep panel or pleated filter
Any 4" deep panel or pleated filter
Any 6" or 12" deep rigid filter
Any headered style rigid or pocket filter In contrast, high efficiency filters, such as 95% DOP filter, HEPA filters and higher efficiency filters, require the use of some type of mechanical clamping mechanism to effectively seal the filter to the filter housing and ensure that any bypass or leakage around that seal is no greater than the maximum penetration of the filter. For example, a HEPA filter with an efficiency of 99.97% has a maximum allowable penetration of 0.03%. Thus, the filter must seal to the filter housing effectively enough so that only a maximum of 0.03% leakage occurs between the filter and the holding frame.

The need to have clamping devices to seal high efficiency filters and various types of fasteners to secure and hold ASHRAE filters results in a very time consuming and costly process when filters must be removed and/or installed. This is particularly true on large filtration systems where dozens, if not hundreds, of filters must be removed and replaced on a regular basis. The use of wrenches, ratchets, or other types of tools is often required in order to loosen nuts, bolts, or other fasteners in order to remove the filters from the holding frames or to loosen the filter clamping mechanisms.

Thus, there is a need for a filter holding frame with a clamping mechanism that does not require the use of tools to operate, that can be used to effectively secure and seal high efficiency filters in a filter housing, while at the same time effectively hold and seal prefilters and lower efficiency filters in the holding frame.

SUMMARY OF THE INVENTION

Embodiments of the invention generally provide a frame assembly having an integral holding frame/clamp. The frame assembly is typically mounted in a housing of an air handler or other air moving conduit. The holding frame/clamp is coupled to the frame assembly by a hinge. The holding frame/clamp is configured to retain a prefilter. When the holding frame/clamp is rotated to a closed position, the holding frame/clamp urges a final filter sealingly against the frame assembly. The clamp holding frame/clamp is maintained in the closed position by a latch. The latch facilitates removal and replacement of the final filter rapidly without tools, thereby substantially reducing the expense associated with filter change out.

BRIEF DESCRIPTION OF DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
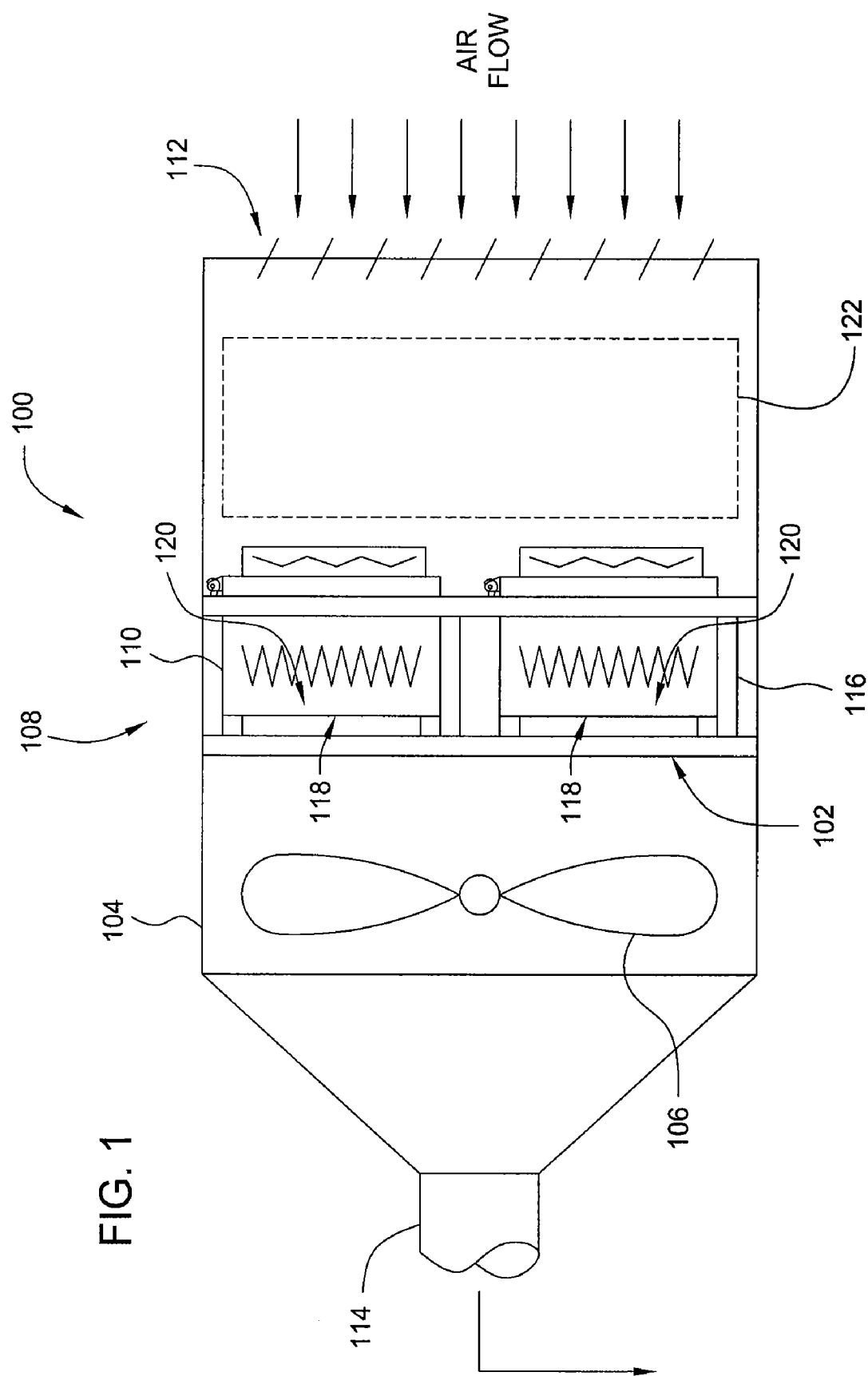
FIG. 1 is a schematic sectional view of one embodiment of an air handler having a frame assembly with an integral holding frame/clamp of the present invention.

FIG. 1 depicts a schematic sectional view of an air handler 100 having a filter frame assembly 102 sealing disposed therein. Although the filter frame assembly 102 is shown mounted inside the air handler 100, it is contemplated that the inventive filter frame assembly 102 may be utilized advantageously in any other air moving conduit.

The air handler 100 generally includes a housing 104 which contains a blower 106 and a filter bank 108 having one or more filters 110 one of which is a final filter 300. The blower 106 draws air into the housing 104 through a grate 112 and through the filter bank 108 to a conduit 114. The filtered air leaving the air handler 100 through the conduit 114 is typically routed to a facility or other location. Although the blower 106 is shown on the downstream side of the frame assembly 102, the blower 106 may alternatively be located in an upstream location.

Figure 3:
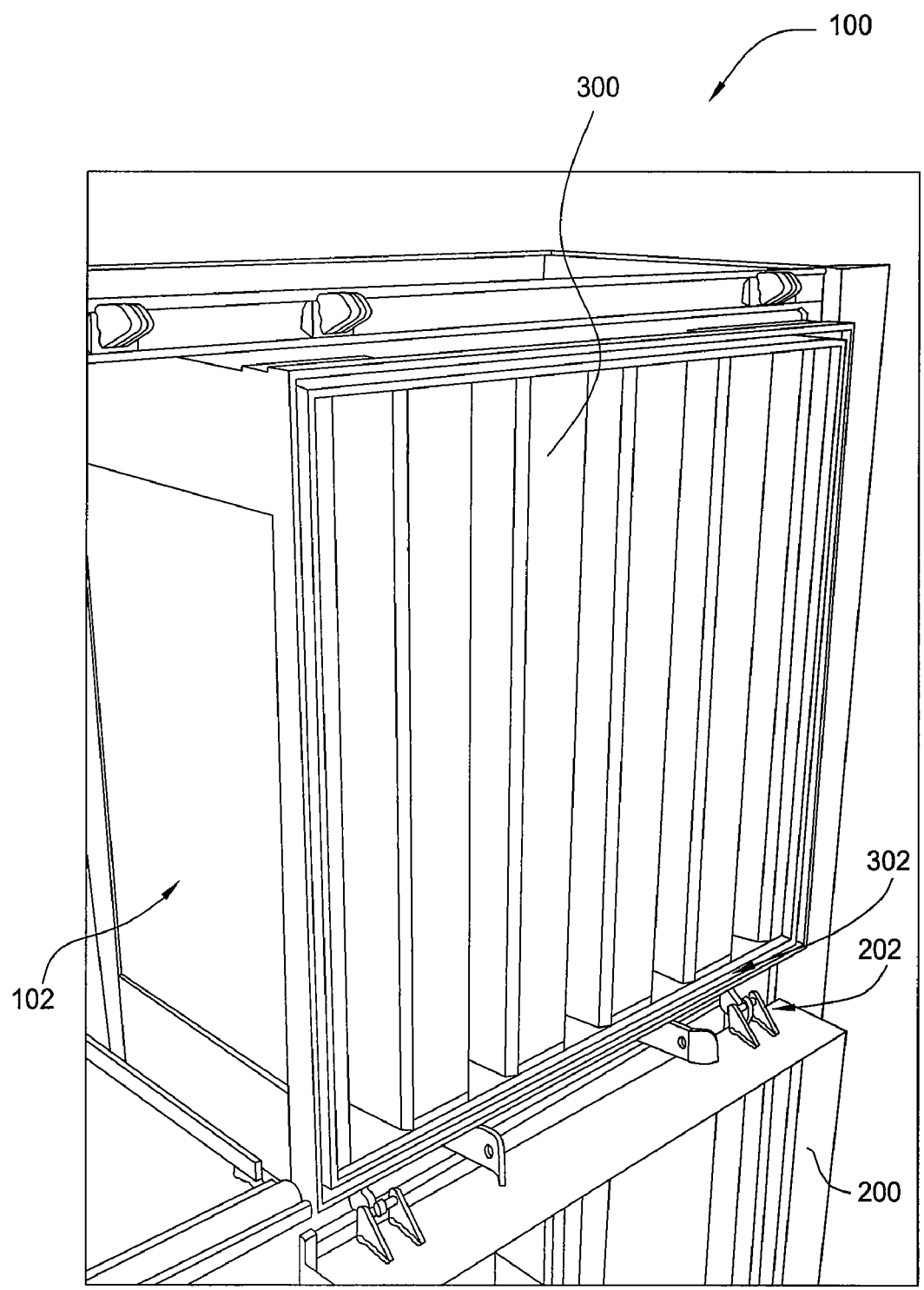
FIG. 3 is a perspective view of a filter housing having a holding frame assembly and a filter installed therein.

The frame assembly 102 is sealingly coupled to the housing assembly 104 and supports the one or more air filters 110 comprising the filter bank 108. The frame assembly 102 may be sealed to the housing 104 by welding, caulking, gaskets, or other suitable methods. Generally, the frame assembly 102 includes a support 116, such as a plate, track, or ledge for holding the air filter 110 in a predefined position relative to an air flow aperture 118 formed in the frame assembly 102. The flow aperture 118 may be in the wall of the frame assembly 102, or by securing one or more single filter frames into a larger frame assembly 102, which may be fastened and sealed together. In the embodiment depicted in FIG. 1, the frame assembly 102 includes a plurality of aperture rows 120, for example, for supporting an upper and lower tier of filters 110. Further, the housing may include an access door 122. FIG. 3 illustrates a final filter 300 in the upper tier of the frame assembly 102 resting on a support 302.

Figure 2A:
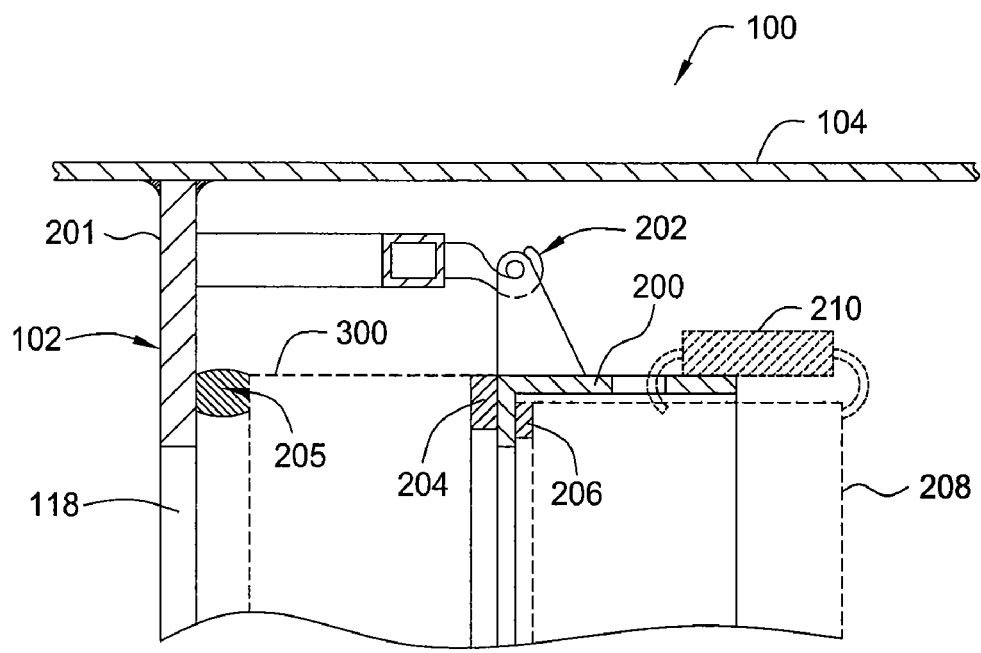
FIGS. 2A-B depict alternative embodiments of a frame assembly respectively having a seal for sealing a filter to the frame assembly.
Figure 2B:
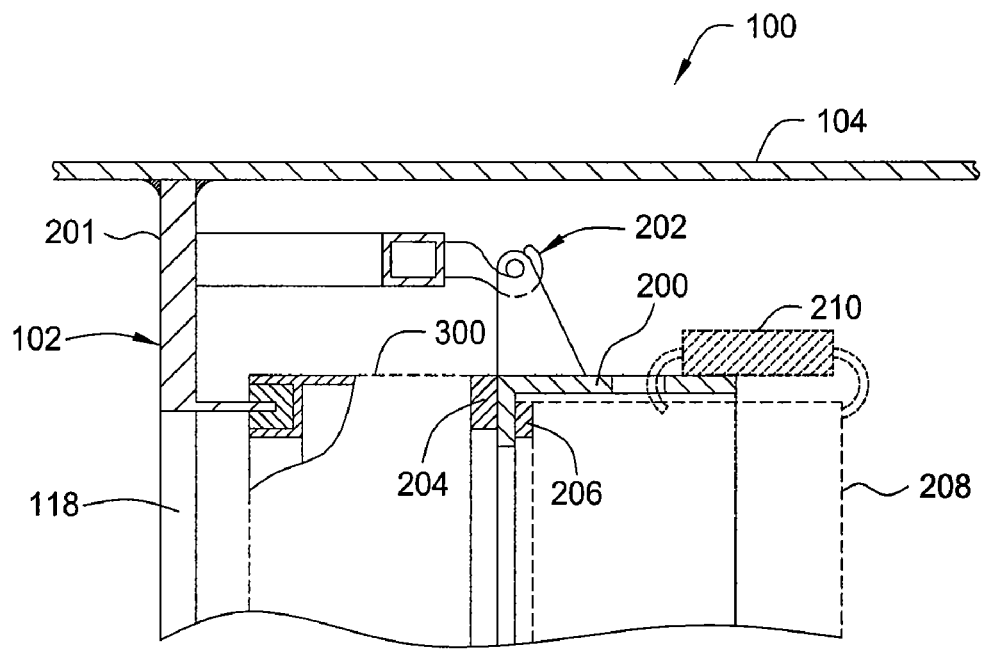

Referring additionally now to FIGS. 2A and 2B, a holding frame/clamp 200 is coupled to a downstream wall 201 of the frame assembly 102 by a hinge 202. The holding frame/clamp 200 may include a gasket 204 on the downstream side which urges the final filter 300 against a gasket or a knife edge 205, shown schematically, of the downstream wall 201 of the frame assembly 102, such that the final filter 300 is sealingly coupled to the frame assembly 102. The gasket or knife edge 205 may be a gel seal, wherein the knife edge 205 contacts a gel to form a fluid seal. Although the final filter 300 is generally a 95% DOP, HEPA, or other high efficiency filter, filters having other efficiencies or configurations may be utilized as required.

A gasket 206 may additionally be provided on the upstream side of the holding frame/clamp 200. The gasket 206 is utilized to seal a prefilter 208, retained to the holding frame/clamp 200 by a spring clip 210 or other device such as a wire clip, to the holding frame/clamp 200. The prefilter 208 is typically an American Society of Heating Refrigeration and Air Conditioning (ASHREA) filter, or other suitable first stage filter.

FIG. 3 illustrates the filter housing 104 with the final filter 300 installed in the upper tier of the frame assembly 102.

Figure 4:
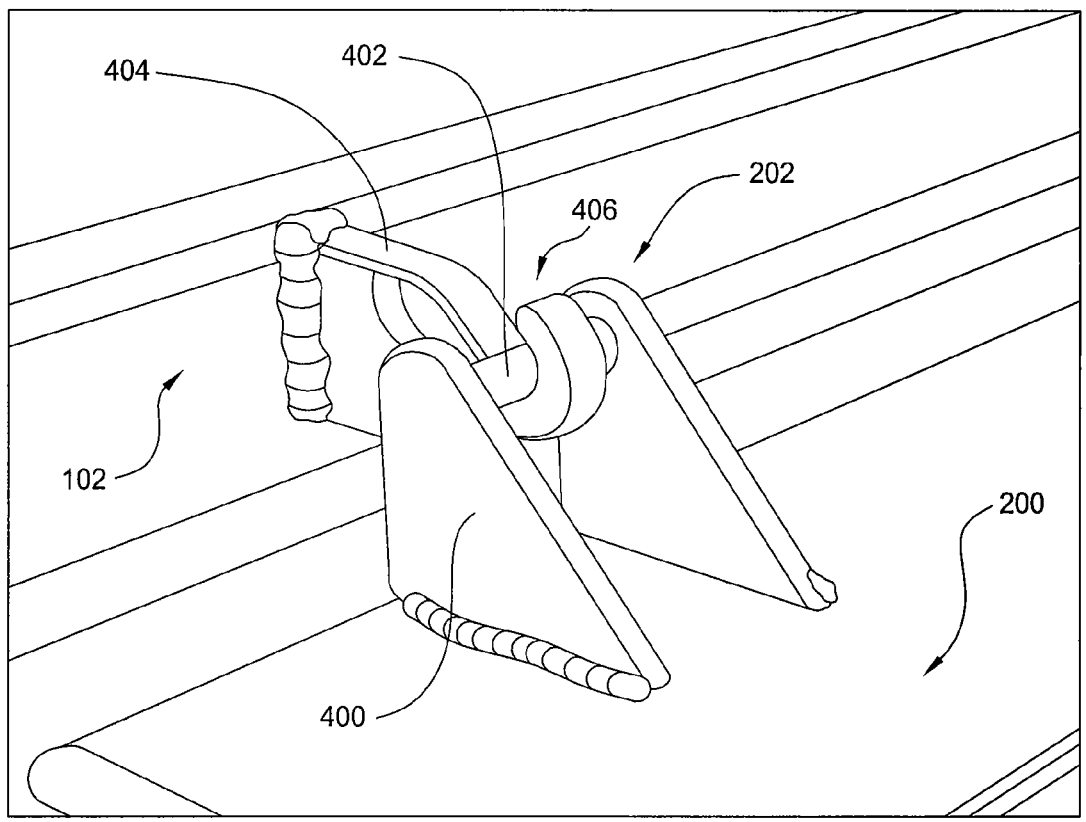
FIG. 4 is a perspective view of one embodiment of a hinge.

FIG. 4 illustrates a view of the hinge 202. As shown, the hinge 202 pivotally couples the holding frame/clamp 200 to the frame assembly 102. The hinge 202 may include one or more gussets 400 coupled to a hinge pin 402. The frame assembly 102 or the housing 104 may have a permanently attached hinge retainer 404 to hold the hinge pin 402. As shown the hinge retainer 404 has an open end 406 which allows the hinge pin 402 to be easily removed from the hinge retainer 404, thereby removing the holding frame/clamp 200 from the frame assembly 102.

Figure 5:
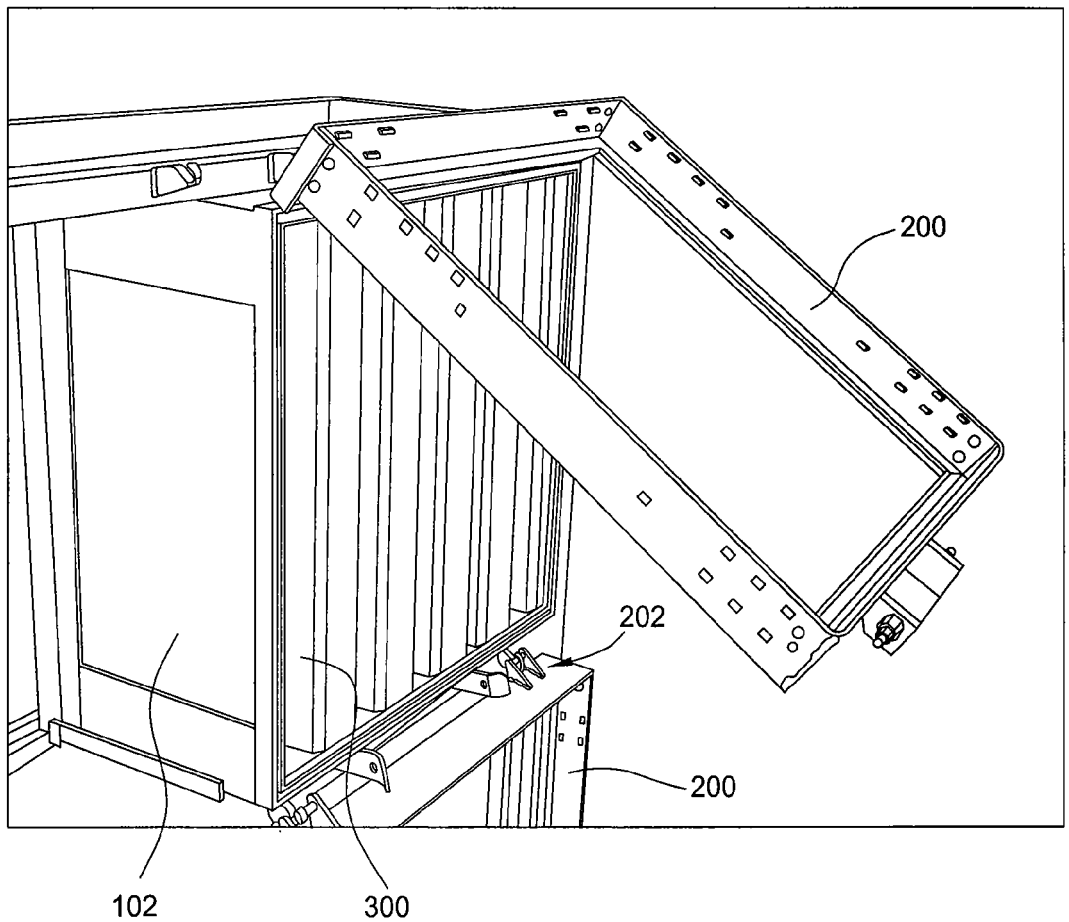
FIG. 5 depicts one embodiment of the holding frame/clamp rotated away from a filter disposed in the holding frame assembly.
Figure 6:
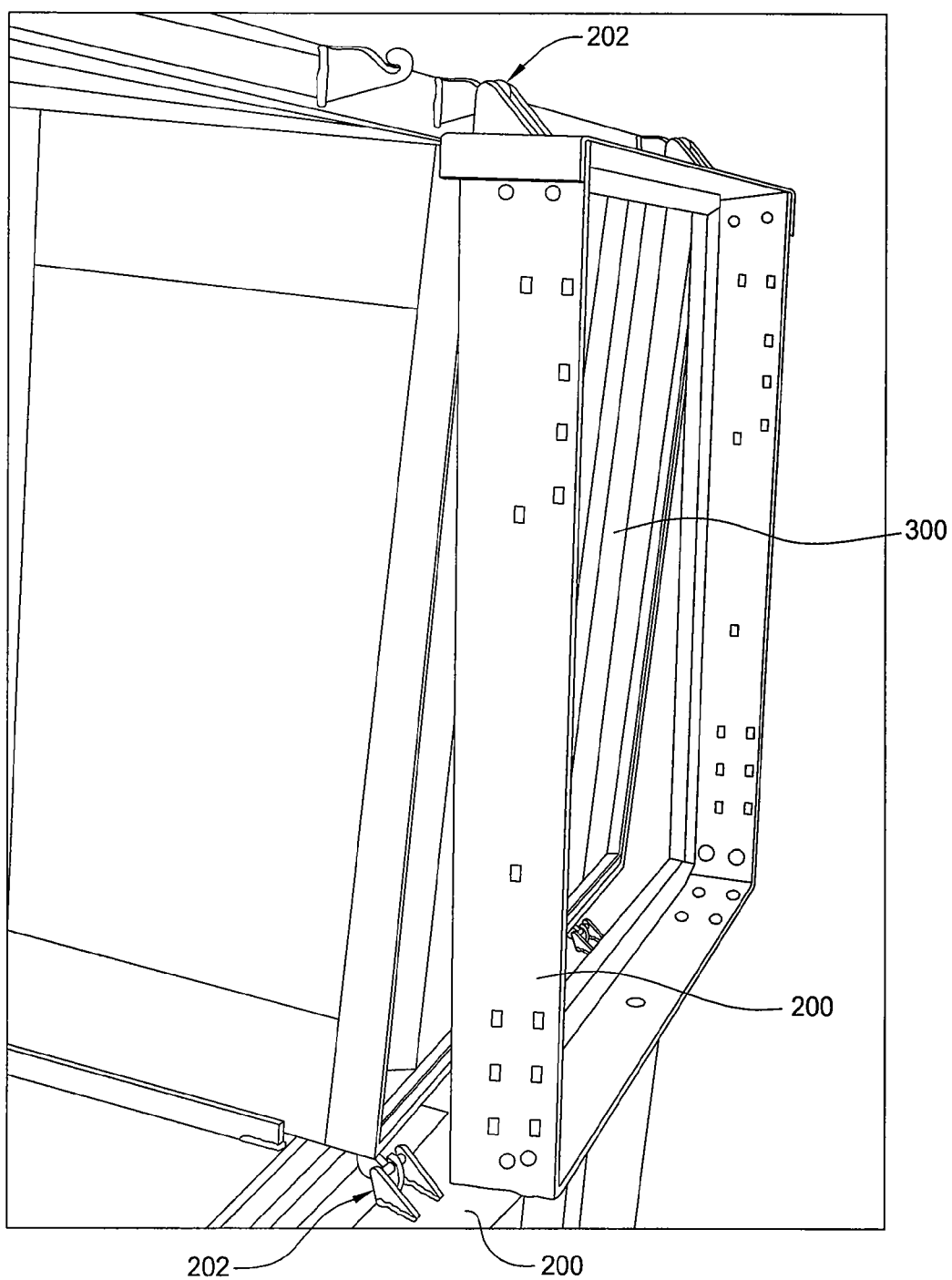
FIG. 6 is a perspective view of the holding frame/clamp slightly ajar from the closed position.
Figure 7:
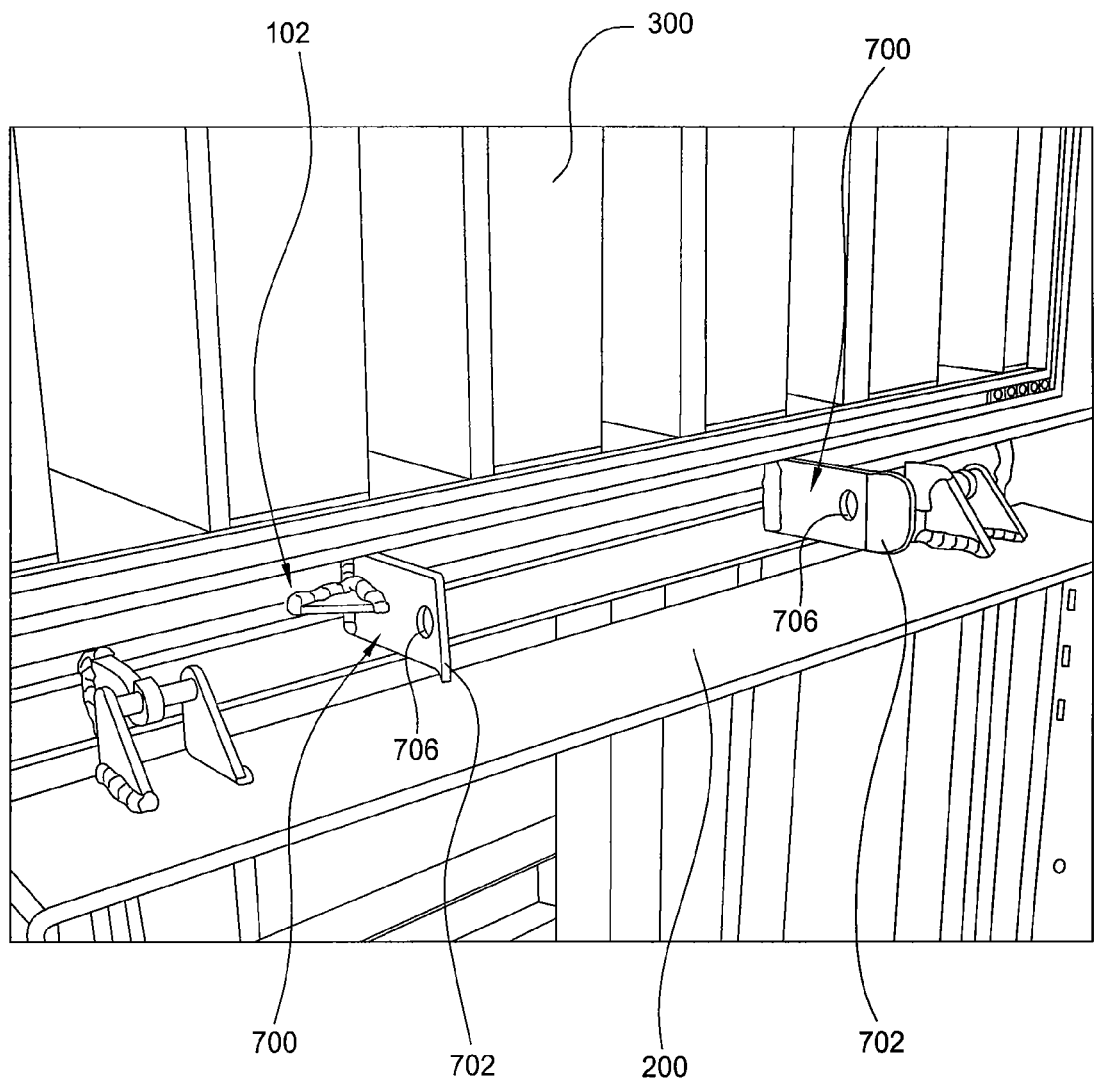
FIG. 7 depicts a perspective view of one embodiment of a latching bracket.
Figure 8:
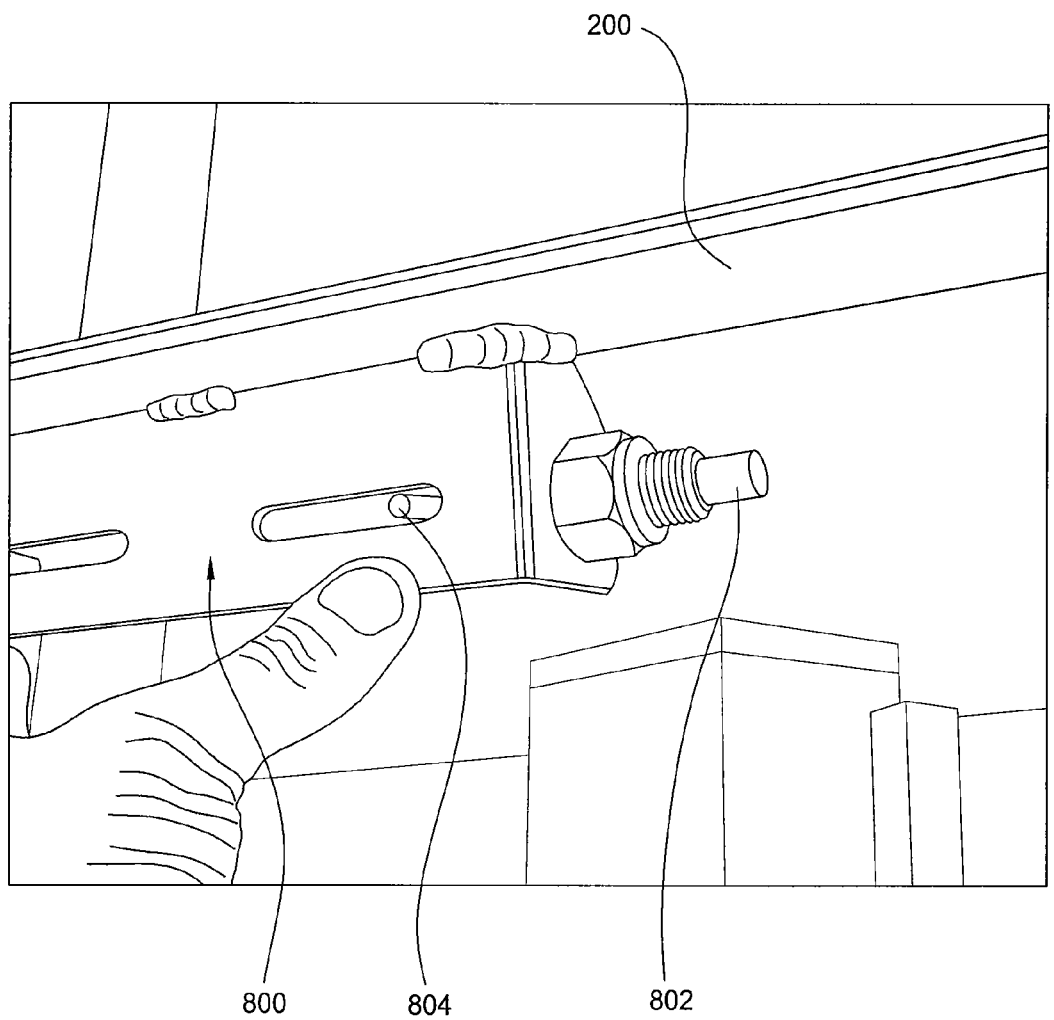
FIG. 8 depicts one embodiment of a latch.
Figure 9:
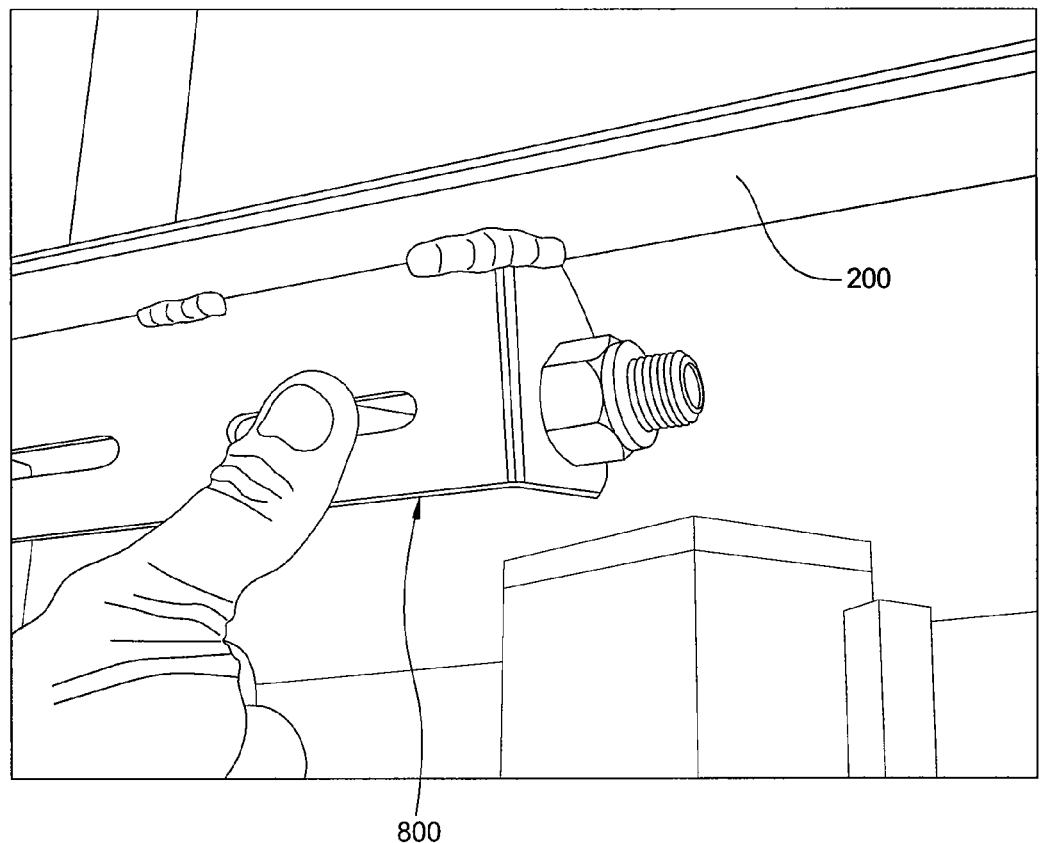
FIG. 9 depicts the latch of FIG. 8 having a plunger in a retracted position.
Figure 10:
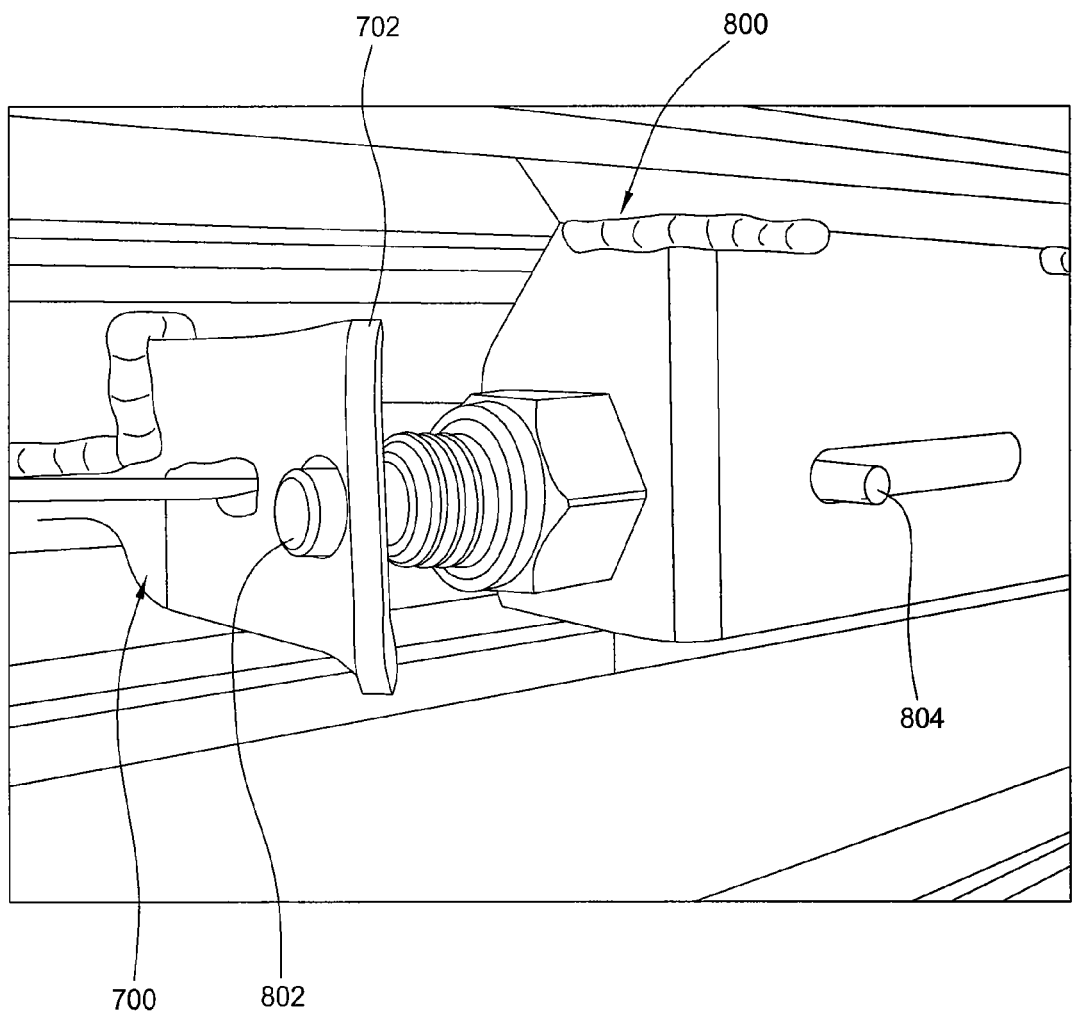
FIG. 10 depicts one embodiment of a latch engaged with a latching bracket.

Referring now to FIGS. 5-6, once the final filter 300 is disposed in the holding frame assembly 102, the holding frame/clamp 200 is rotated to urge the filter 300 sealingly against the downstream wall 201 of the frame assembly 102. The configuration of the hinges 202 is such that in order to secure the holding frame/clamp 200 in the closed position, the gasket or knife edge 205 must be sufficiently compressed to urge and/or retain the final filter 300 in a predefined position against the downstream frame wall 201. In embodiments wherein the depth of the final filter 300 is not large enough to respectively touch the downstream wall 201 and the holding frame/clamp 200, a hollow spacing frame, not shown, may be disposed in the frame assembly serially with the final filter 300.

FIG. 6 illustrates the holding frame/clamp 200 ready to be latched in the closed position. The holding frame/clamp 200, as shown, is touching the top of the filter 300 but is spaced away from a bottom of the filter. This allows the holding frame/clamp 200 to compress the gasket or knife edge 205 when the holding frame/clamp 200 is latched in the closed position.

FIGS. 7-10 depict one embodiment of a latch 800 suitable for securing the holding frame/clamp 200 in a closed position. The latch 800 is generally coupled to the holding frame/clamp 200 while one or more latching brackets 700 are coupled to the frame assembly 102 or vice versa. In embodiments which the filters 110 are vertically tiered, the upper latching brackets are staggered with the lower hinges to avoid interference.

Figure 11:
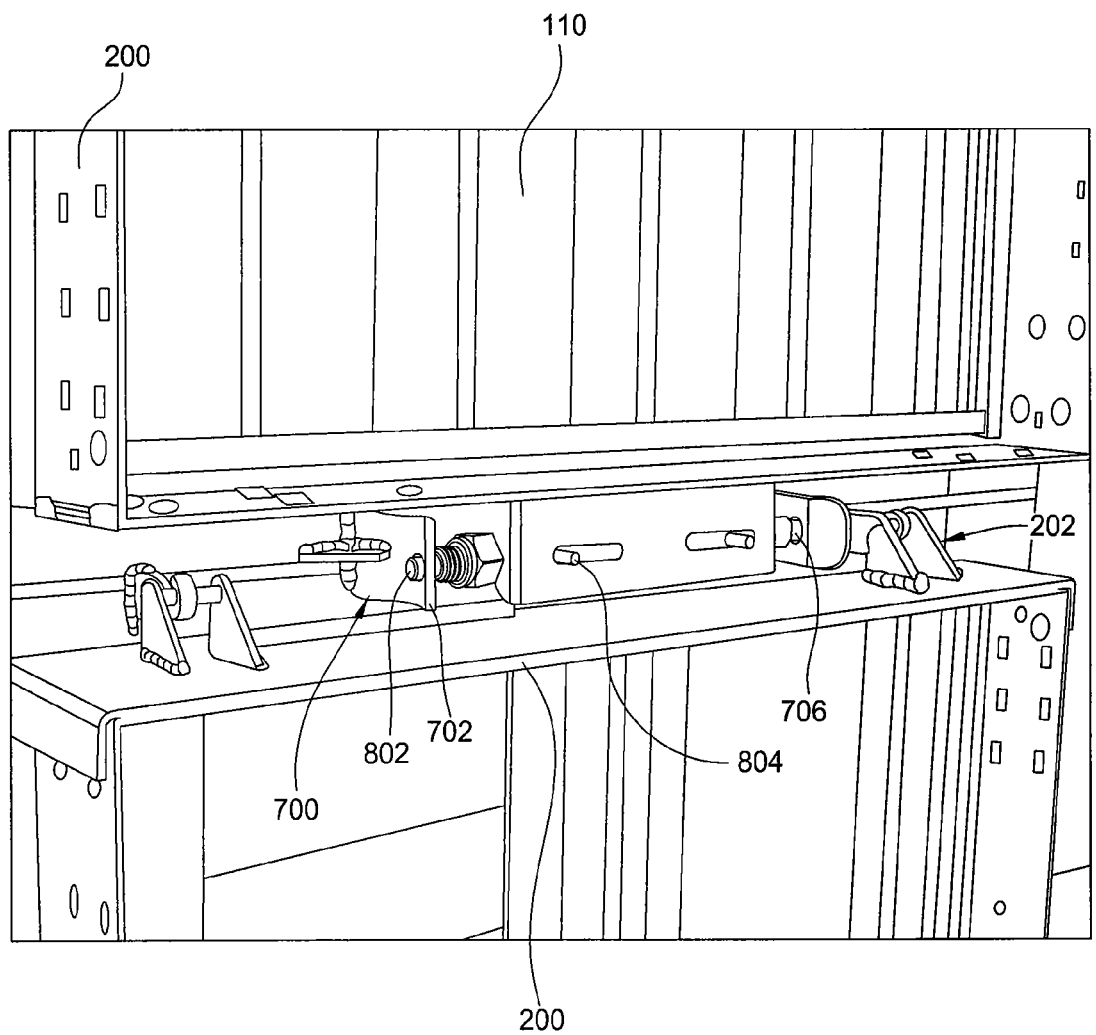
FIG. 11 depicts a partial perspective view of a final filter retained to a frame assembly by a holding frame/clamp.

FIG. 11 illustrates the one or more filters 110 installed and secured in an upper tier of the holding/clamping frame 200.

In one embodiment, the latching brackets 700 extend substantially perpendicular from the upstream side of the frame assembly 102. The distal ends of the latching brackets 700 are angled or flared 702 outward to facilitate engagement with the latch 800 coupled to the holding frame/clamp 200.

In one embodiment, the latch 800 includes a spring-loaded plunger 802 which is automatically depressed when the frame/clamp 200 is rotated to the closed position. This is due to the relative position of the flared end 702 of the latching bracket 700 and the position of the latch 800 on the holding frame/clamp 200 which causes the plunger 802 to recess upon contact with the flared end 702. Once the holding frame/clamp 200 is rotated into the closed position compressing the gasket or knife edge 205, the plunger 802 extends and engages with a hole 706 formed through the latching bracket 700, thereby securing the holding frame/clamp 200 in the closed position. This allows the filter 110 to be secured in the holding frame assembly 102 by merely closing the holding frame/clamp 200 and allowing the latch 800 to automatically engage the latching bracket 700. A slide pin 804 may be provided on the latch 800 to manually retract the plunger 802 to release the latch 800 from the latching brackets 700 without tools. It is contemplated that other types of latches may be utilized, for example, over center latches, detents, spring clips, and the like. It is additionally contemplated that the latch may include a quick disconnect, such as a bayonet, quarter turn fitting, and the like. Alternatively, the latch may include a threaded knob or other fastener.

Since little or no tools are used to remove and secure filters 110 to the frame assembly 102, filter replacement is rapid, efficient, and at minimal cost relative to filter exchanges in conventional systems. As a dedicated holding frame/clamp 200 secures the final filter 300 in a respective aperture 118 of the frame assembly 102, variations between the one or more filters 110 and holding frames 200 are accounted for on a filter-by-filter basis to ensure proper sealing between the final filter 300 and the holding frame assembly 200. Moreover, the frame assembly 102, with integral holding frame/clamp 200, allows the final filter 300 to be exchanged without removal of the prefilter from the holding frame/clamp 200.

While the foregoing is directed to embodiments of the invention, other and further embodiments of the invention may be devised without departing from the basic scope thereof, and the scope thereof is determined by the claims that follow.

What is claimed is:

1. A filter housing assembly comprising:
    a housing having an inlet and an outlet;
    a filter frame assembly disposed within the housing between the inlet and the outlet and sealingly coupled to the housing, the filter frame assembly having one or more filter receiving apertures; wherein a flow path is defined through the housing such that air enters through the inlet, passes through the filter frame assembly, and exits through the outlet;
    a holding clamp pivotably coupled to the filter frame assembly and having one or more clamp apertures that respectively align parallel with the one or more filter receiving apertures when the holding clamp is in a closed position, the holding clamp configured to sealingly hold one or more filters against the filter frame assembly between the clamp apertures and the filter receiving apertures when the holding clamp is in the closed position; and
    an automatic latch coupled to one of the filter frame assembly or the holding clamp, the automatic latch configured to automatically secure the holding clamp relative to the filter frame assembly as the holding clamp is rotated into the closed position.

2. The filter housing assembly of claim 1, wherein the holding clamp is pivotally coupled to a top of the filter frame assembly.

3. The filter housing assembly of claim 1, wherein the filter frame assembly further comprises a latch aperture formed therein; and
wherein the automatic latch further comprises a spring biased plunger coupled to the holding clamp and configured to engage the latch aperture when the holding clamp is in the closed position.

4. The filter housing assembly of claim 3, further comprising a latch bracket having a flared end, wherein the flared end is configured to actuate the plunger as the holding clamp moves toward the closed position.

5. The filter housing assembly of claim 3, further comprising a slide pin coupled to the plunger and configured to allow the plunger to be moved against the bias of the spring.

6. The filter housing assembly of claim 1, wherein in the filter frame assembly further comprises a knife edge configured to sealingly engage a gel seal filter.

7. The filter housing assembly of claim 1, wherein in the filter frame assembly further comprises a flat surface configured to sealingly engage a gasket seal filter.

8. The filter housing assembly of claim 1, wherein the one or more filter receiving apertures further comprise a first receiving aperture located above a second receiving aperture.

9. The filter housing assembly of claim 1, wherein the holding clamp has a downstream side configured to sealingly engage the one or more filters, wherein the holding clamp is coupled to the filter frame assembly by a hinge.

10. The filter housing assembly of claim 9, further comprising a mechanism configured to secure a prefilter to the holding clamp.

11. The filter housing assembly of claim 10, wherein the mechanism is a spring.

12. The filter housing assembly of claim 10, wherein the prefilter is configured to move with the holding clamp when pivoted about the hinge, to provide access to the one or more filters.

13. The filter housing assembly of claim 1, wherein the latch further comprises a plunger adapted to engage a latch bracket extending from the holding clamp when the holding clamp is in the closed position.

14. The filter housing assembly of claim 1 further comprising:
a second holding clamp disposed in the housing and rotatable to a position that sealingly secures a second of the one or more filters against the filter frame assembly.

* * * * *

UNITED STATES PATENT AND TRADEMARK OFFICE
CERTIFICATE OF CORRECTION

| | | |
|---|---|---|
| PATENT NO. | : 8,062,402 B2 | Page 1 of 1 |
| APPLICATION NO. | : 11/670907 | |
| DATED | : November 22, 2011 | |
| INVENTOR(S) | : Bland et al. | |

It is certified that error appears in the above-identified patent and that said Letters Patent is hereby corrected as shown below:

In column 2, line 5-6, delete "frame/lamp" and insert -- frame/clamp --, therefor.

In column 2, line 7, after "is" insert -- rotated --.

In column 2, line 11, delete "ter" and insert -- filter --, therefor.

Signed and Sealed this
Thirtieth Day of October, 2012

David J. Kappos
*Director of the United States Patent and Trademark Office*